United States Patent [19]
Calçavara, Jr et al.

[11] Patent Number: 5,984,192
[45] Date of Patent: *Nov. 16, 1999

[54] SUPPLEMENTARY CODING ON INDUCTIVE DEBIT CARDS AND READING PROCESS

[75] Inventors: Enio Calçavara, Jr, Salto; Antonio Massao Nishikawa, Campinas, both of Brazil

[73] Assignee: Telecommunications Brasileiras S/A, Campinas, Brazil

[ * ] Notice: This patent issued on a continued prosecution application filed under 37 CFR 1.53(d), and is subject to the twenty year patent term provisions of 35 U.S.C. 154(a)(2).

[21] Appl. No.: 08/737,362
[22] PCT Filed: May 11, 1995
[86] PCT No.: PCT/BR95/00029
 § 371 Date: Nov. 8, 1996
 § 102(e) Date: Nov. 8, 1996
[87] PCT Pub. No.: WO95/31792
 PCT Pub. Date: Nov. 23, 1995

[30] Foreign Application Priority Data

May 12, 1994 [BR] Brazil ..................................... 9401059

[51] Int. Cl.$^6$ .................................................. G06K 19/06
[52] U.S. Cl. ......................... 235/494; 235/492; 235/451
[58] Field of Search .................................. 235/494, 492, 235/493, 487, 449, 450, 451, 443, 444, 375

[56] References Cited

U.S. PATENT DOCUMENTS

| | | | |
|---|---|---|---|
| 3,248,710 | 4/1966 | Stapper, Jr. ........................ | 235/451 X |
| 3,376,559 | 4/1968 | Yamato et al. ..................... | 235/451 X |
| 3,397,393 | 8/1968 | Palmateer et al. ................. | 235/451 X |
| 3,699,311 | 10/1972 | Dunbar ............................... | 235/451 |
| 3,700,862 | 10/1972 | Snook et al. ....................... | 235/494 |
| 3,716,701 | 2/1973 | Cohen ................................ | 235/451 |
| 4,029,945 | 6/1977 | Yamada et al. ..................... | 235/449 |
| 4,146,781 | 3/1979 | Machate ............................. | 235/439 |
| 4,328,415 | 5/1982 | Eaton ................................. | 235/494 X |
| 4,587,410 | 5/1986 | Milnes ............................... | 235/451 X |
| 4,752,680 | 6/1988 | Larsson ............................. | 235/451 X |
| 4,786,940 | 11/1988 | Daniele .............................. | 235/494 X |
| 4,798,322 | 1/1989 | Bernstein et al. ................. | 235/451 X |
| 4,883,949 | 11/1989 | Kokubo et al. ..................... | 235/494 X |
| 5,416,311 | 5/1995 | Kyriazis ............................. | 235/494 |
| 5,471,040 | 11/1995 | May ................................... | 235/492 X |
| 5,621,200 | 4/1997 | Irwin, Jr. et al. ................... | 235/492 X |
| 5,834,757 | 11/1998 | Fernandes et al. ................. | 235/493 |

FOREIGN PATENT DOCUMENTS

| | | |
|---|---|---|
| 9304503 | of 0000 | Brazil . |
| 7804885 | 7/1978 | Brazil . |
| 921380 | 4/1992 | Brazil . |
| 0422481 | 4/1991 | European Pat. Off. . |
| 2 463 457 | 2/1981 | France . |
| 22 57 021 | 6/1974 | Germany . |
| 26 50 959 | 1/1978 | Germany . |
| 1260982 | 9/1986 | U.S.S.R. . |
| 2 061 820 | 5/1981 | United Kingdom . |

*Primary Examiner*—Michael G. Lee
*Attorney, Agent, or Firm*—Finnegan, Henderson, Farabow, Garrett & Dunner, L.L.P.

[57] ABSTRACT

Supplementary coding on inductive debit cards and reading method by which information regarding variables, such as date of issue and country in which the card is valid, are included without any change in the number of credits on the card by using front and back handling strips normally provided on such cards. Such an encoding comprises the division of the strips, into a number of segments or tracks equal to the number of cell columns on the card, each track coinciding with the columns. Metalized tracks correspond to bit "1 " and non-metalized tracks to bit "0 ", the 4 tracks located at the corners of the card always being metalized. Reading of the information on the card is carried out during the insertion of the card into a reading head by a row of sensors farthest away from the entrance slot of the reading head. On detecting the presence of a pair of metalized tracks on the corners of the card, the bits contained in the handling strip are read and stored in a temporary register for later interpretation.

9 Claims, 8 Drawing Sheets

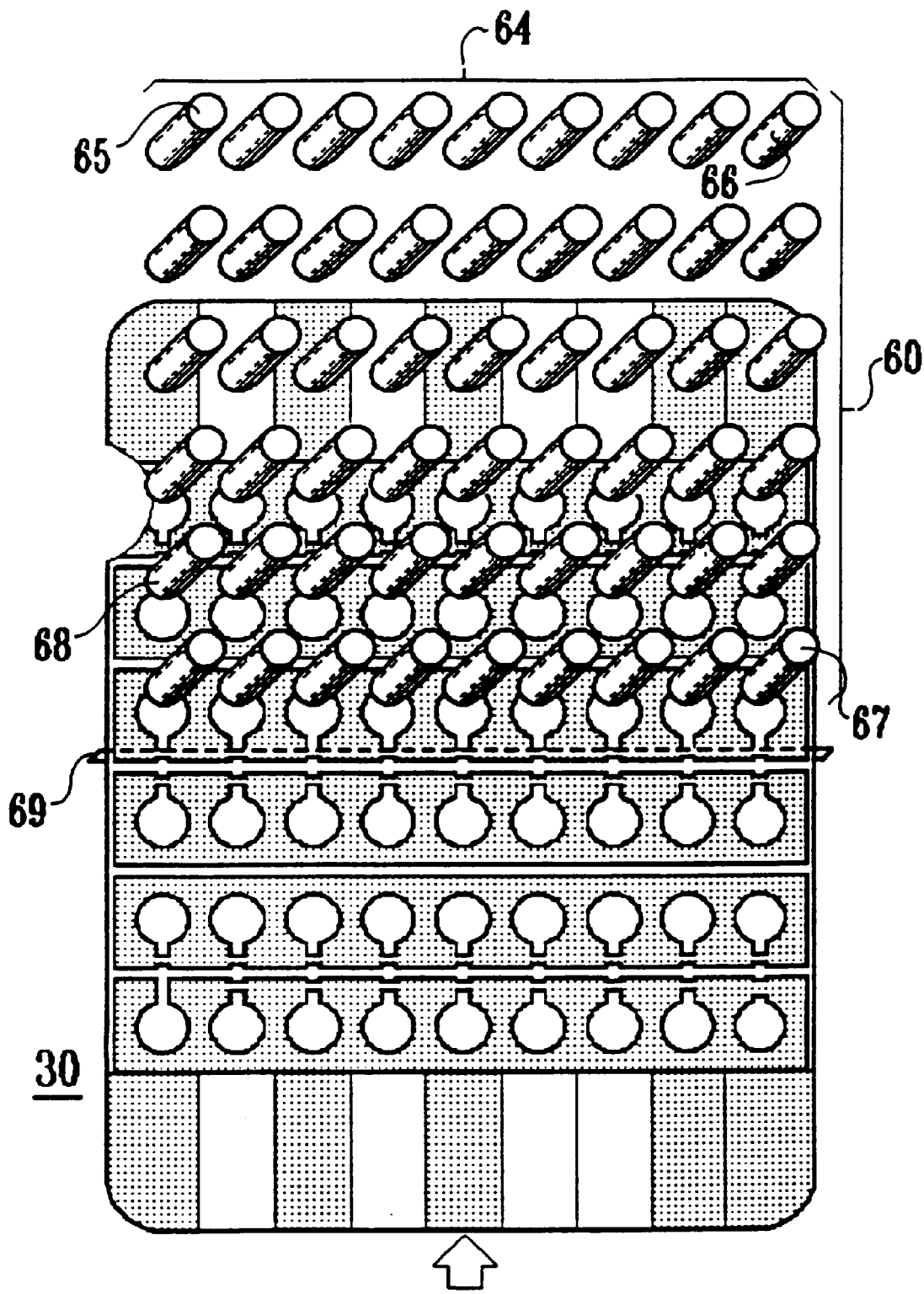
Fig.4-a

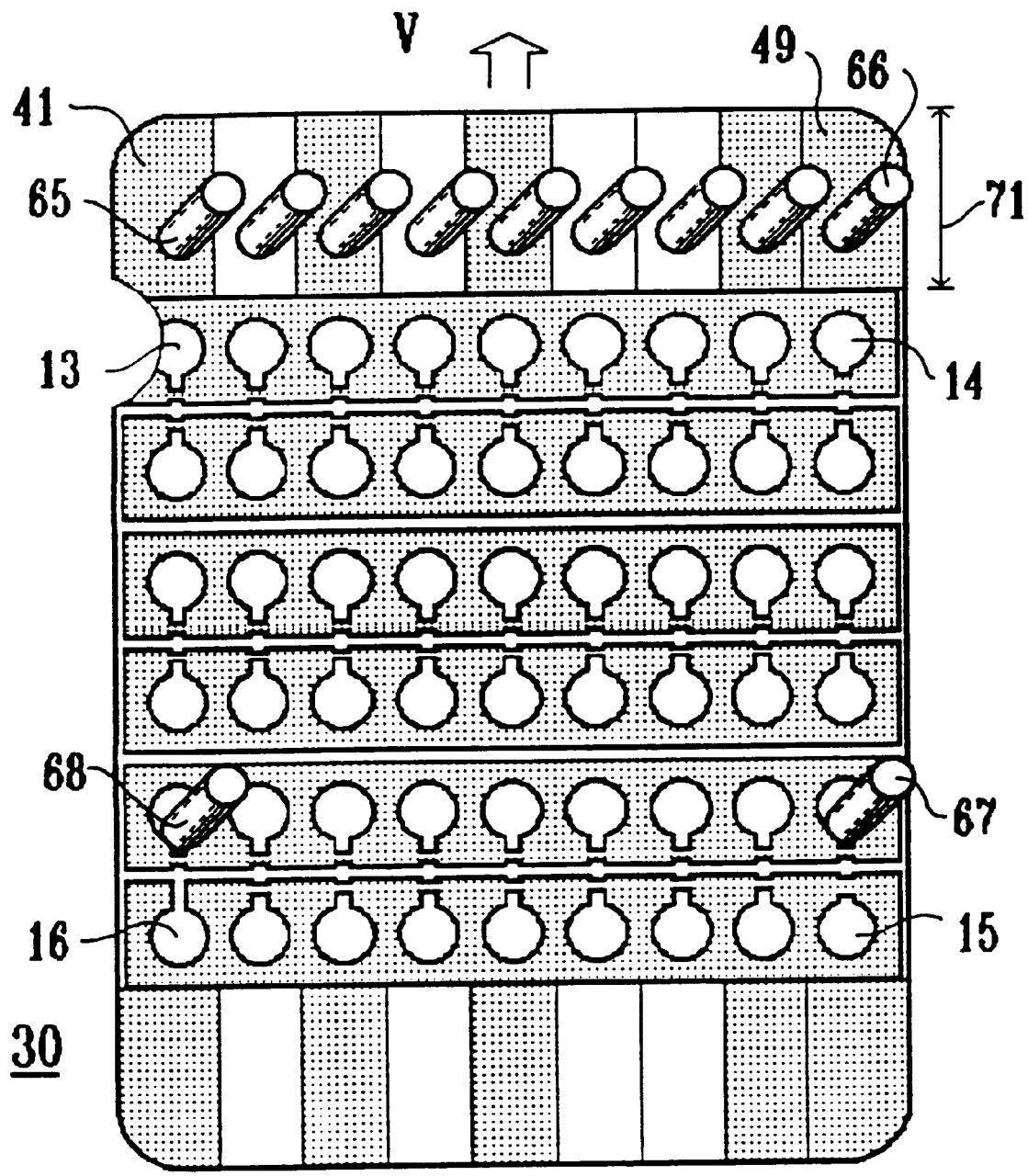
Fig.4-b

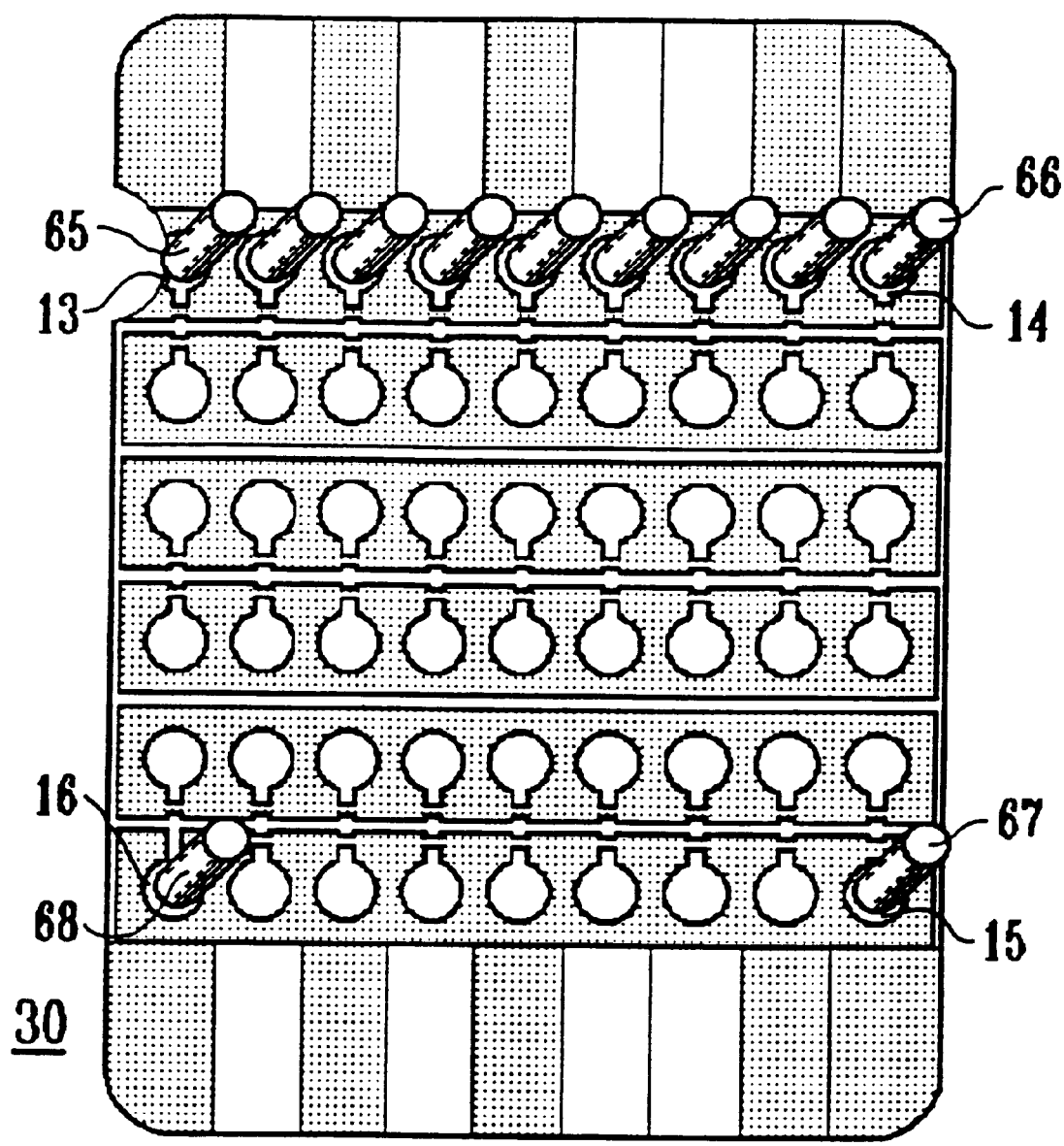
Fig.4-c

SUPPLEMENTARY CODING ON INDUCTIVE DEBIT CARDS AND READING PROCESS

BACKGROUND OF THE INVENTION

1. Field of the Invention

The present invention concerns the improvement of disposable inductive debit cards, such as the ones described in patent document BR 9201380-5 and BR 9304503-4 and, specifically, to the insertion of supplementary information on the cards, as well as to its reading using the existing reading devices as described in those patents.

2. Description of the Related Art

Inductive debit cards based on concepts originally contained in patents BR 7804885, DE 2650959 and U.S. Pat. No. 4,029,945 are well known and are widely used as credit elements in public telephone systems. FIG. 1 exemplifies the main features of a known card, akin to the one in FIG. 1 of above mentioned document BR 9304503-4, containing a plurality of credit elements 12, arranged in 6 rows and 9 columns, totaling 50 usable credits since four of the cells at corners 13, 14, 15 and 16 are used as indexing elements. The card also has blank strips 17 and 18, located between the central area and front end edge 19 and back edge 21, which are made use of during insertion and withdrawal of the card from the reading head.

Even though the shown card is suitable for experimental use, or small scale applications, the commercial use on a large scale basis requires the inclusion of additional information, such as, for instance, the following:

Card validation date

Code of the country issuing the card

Manufacturers identification code

The inclusion of this information in central area 11 would necessarily reduce the number of available credits on the card.

On the other hand, including the information on strips 17 and 18 entails, as a drawback, the need to modify the reading head, since the existing heads do not have sensors positioned at the strips. In view of the large number of telephone sets of this kind that are already in operation, such a solution would require the expenditure of large amounts of money, materials and labor, as all the installed reading heads would have to be replaced.

SUMMARY OF THE INVENTION

From the foregoing, the main objective of the present invention is the provision of a way of including the supplementary information on cards while keeping the number of credits unchanged, and associating it with a reading process of this information which uses the already existing reading heads, eliminating the need of any structural change to the latter.

This and other objectives are achieved by the present invention by including metalized elements on the handling strips, having shapes and dimensions that allow for the reading of data on a card in motion.

According to another aspect of the present invention, the reading is carried out during the time the strip is passing by the row of sensors placed farthest away from the card inserting slot.

According to still another aspect of the present invention, the supplementary information is read off independently of card orientation in the reading head.

According to another aspect of the invention, the card is provided with indexing elements which allow for detectkion, during the insertion of the card into the reading head, of the existence of the metalized elements while passing by the row of sensing coils that read off the information there contained.

BRIEF DESCRIPTION OF THE DRAWINGS

The previously mentioned characteristics, as well as other aspects and advantages of the present invention, will become more evident from a detailed description of a preferred embodiment and of the attached drawing figures where:

FIGS. 4-*a*–4-*c* show the different positions of the card relative to the reading head, during the several stages of its insertion, according to the principles of the present invention.

DESCRIPTION OF THE PREFERRED EMBODIMENT

Figure 1:
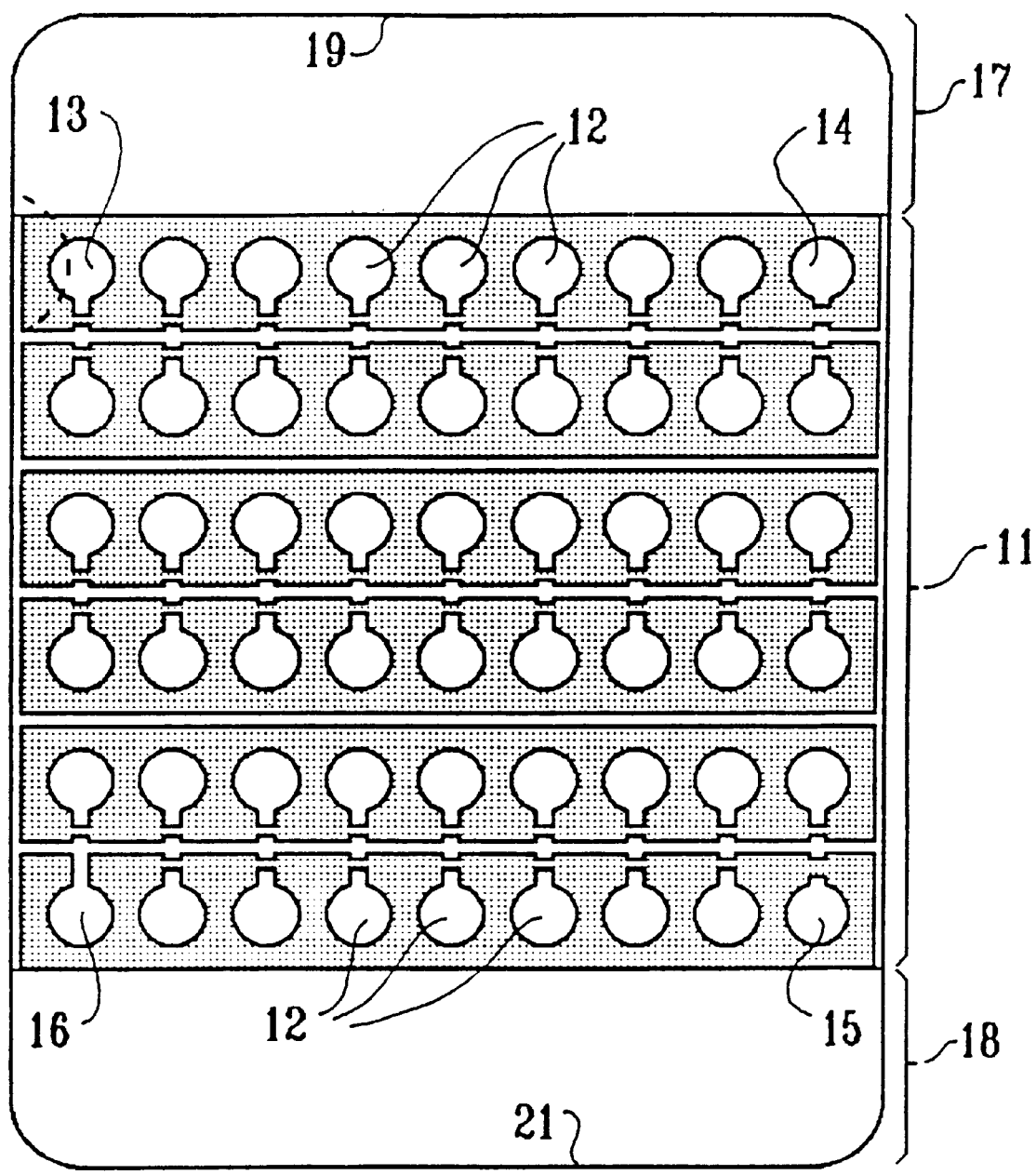
FIG. 1 shows a known inductive debit card, such as described in document BR 9304503-4.
Figure 2:
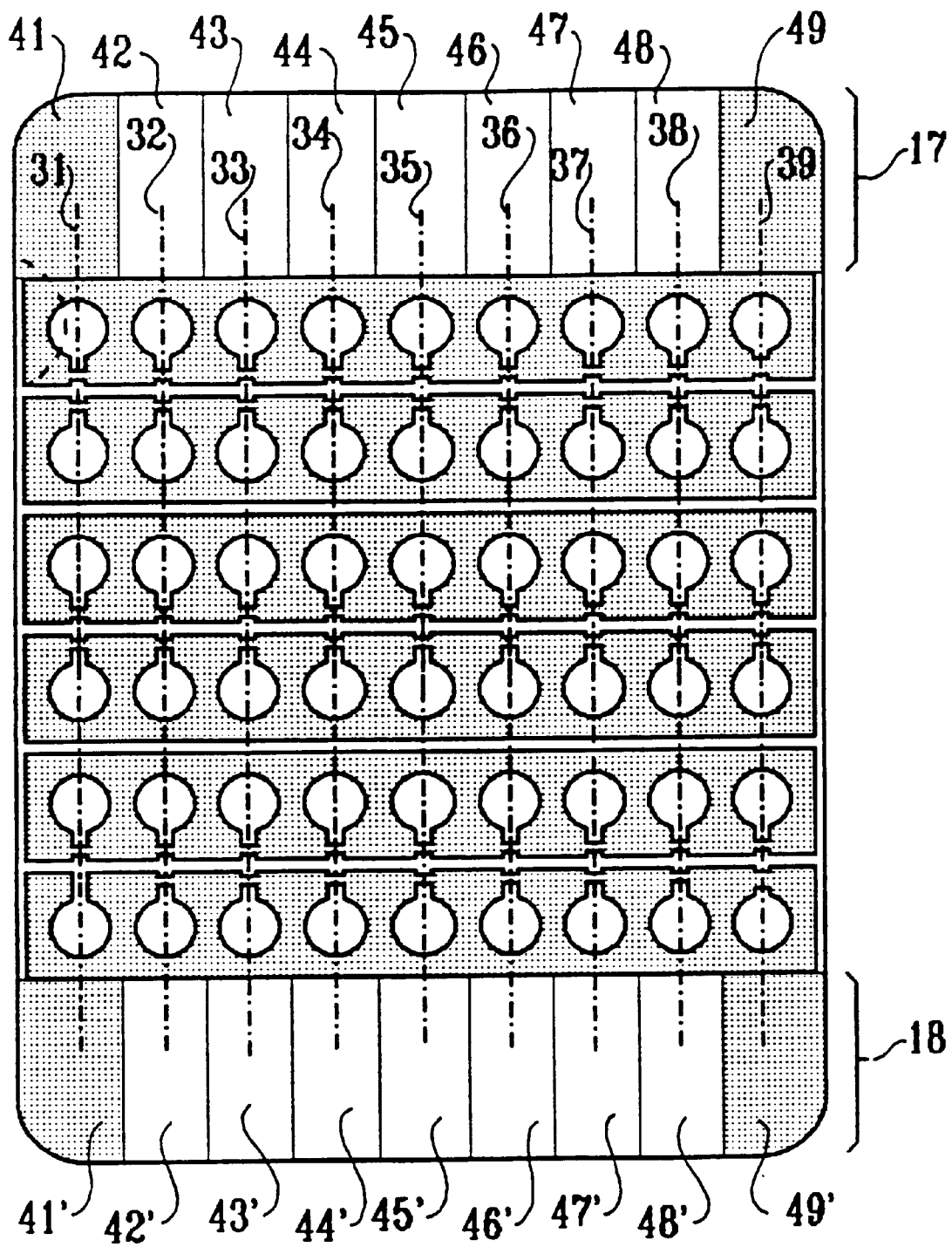
FIG. 2 shows the placement of the information carrying elements in the handling strips of an inductive debit card, according to the principles of the present invention.

As shown in FIG. 2, the front handling strip 17 is divided, in the direction of the card width, into as many segments or tracks 41, 42, . . . 49, as the cell columns on the card, the segments being aligned with the axes 31, 32, . . . 39 of the columns. The rear handling strip 18 is divided in the same way into segments 41', 42'. . . 49'.

According to the principles of the present invention, the four segments 41, 49, 41', 49', located on the corners of the card, are always metalized; in the remaining segments, the presence or absence of metalization will correspond to the data bit—1 or 0, respectively—represented by each segment.

Still according to the principles of the present invention, the data bit sequences are identical on strips 17 and 18, which allows for the reading of the information independently of the card orientation during insertion into the reading head. Moreover, the use of the available bits will depend on the number of variables one wishes to represent as well as on the range of possible values of each variable.

Figure 3:
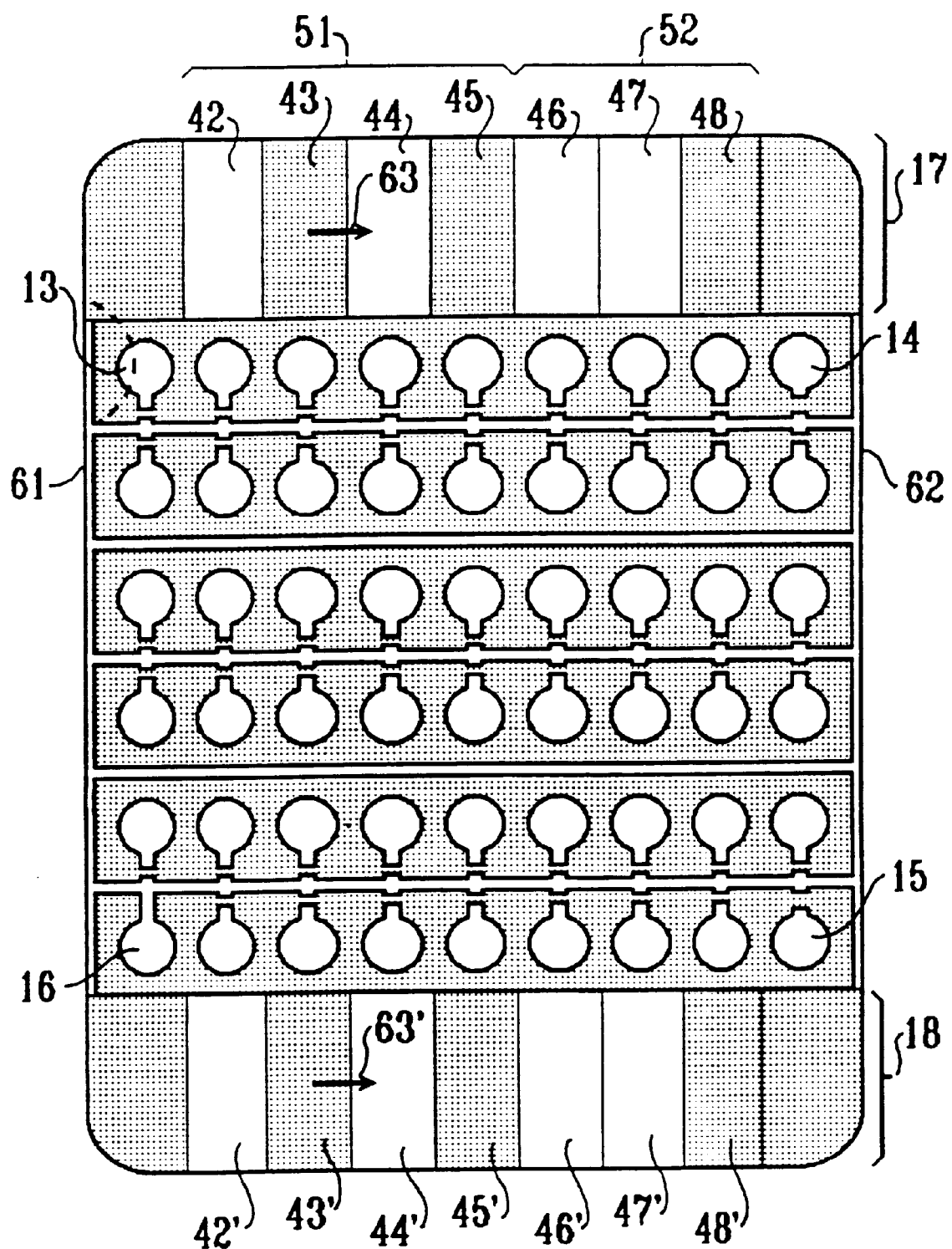
FIG. 3 shows an example of information coding, as well as the reading direction of the information, according to the principles of the present invention.

FIG. 3 shows how two variables can be encoded on the card shown in FIG. 2, such as, for example, the issue date and the country issuing the card. From a total of 7 available bits, 4 bits from blocks 51 and 51' are made use of to encode the issue date of the card and 3 bits from block 52 and 52' to codify the country issuing the card. Considering, for example, that it is wished to encode the quarter in which the card was issued, then block 51 allows $2^4=16$ quarterly issuing periods, equivalent to 4 years, while block 52 allows to encode $2^3=8$ different countries. In the exemplary encoding of FIG. 3, tracks 42 and 44 have no metalization, and segments 43 and 45 are metalized; the reading of the code, carried out in the direction 63 (left-hand border 61 to right-hand border 62 of the card) gives the binary coded number 0101, indicating that the card was issued on the 5th quarter counted from a standard reference date. In block 52, segments 46 and 47 are not metalized, while track 48 is metalized, indicating the binary number 001, corresponding, for instance, to cards issued in Brazil. In this way, cards having a different code in block 52, as for example, 002, 003, etc., would be rejected since these correspond to cards issued in other countries (for example, 002=Uruguay, 003=Argentina, etc.). As previously mentioned, the encoding by metalizing segments of strip 18 would be identical to the one of strip 17, thus tracks 43', 35'and 48 are metalized while the remaining ones are not, since reading directions 63' and 63 are the same in both strips 17 and 18.

The designation of the side edges is set by convention. In this case, "left-hand" is considered to be edge 61 of the card, adjacent to open-circuited indexing cells 13 and 16, "right-hand" edge 62 being adjacent to the short-circuited cells 14 and 15.

For reading the supplementary data on a card, it makes no difference on which handling strip, 17 or 18, the reading is performed since both contain the same data. This detection employs the same principle used for the reading the credit cell condition, i.e., a metalized segment will draw power from the sensing coil circuit due to the induction, by magnetic coupling, of a current on the metallic film. On the absence of metalization, this loss does not take place and the voltage between the terminals of the coil will be significantly larger, as taught on page 13, lines 15 to 19 of patent document BR 9203968-5, among others.

As already mentioned, the existing reading heads comprise only sensors positioned coincidently with the credit cells occupying central region 11 of the card, thus making it necessary to perform the reading of the data on the handling strips before the card has reached its final position within the reading head, that is, while the card is being inserted into the reading head. According to the present invention, the reading is carried out by the row of sensing coils the farthest away from the insertion slot, while the handling strip is passing by those sensors. All that is necessary to carry out such a reading is to change the software of the reading head, avoiding the need for any hardware modification in the reading head.

Figure 5:
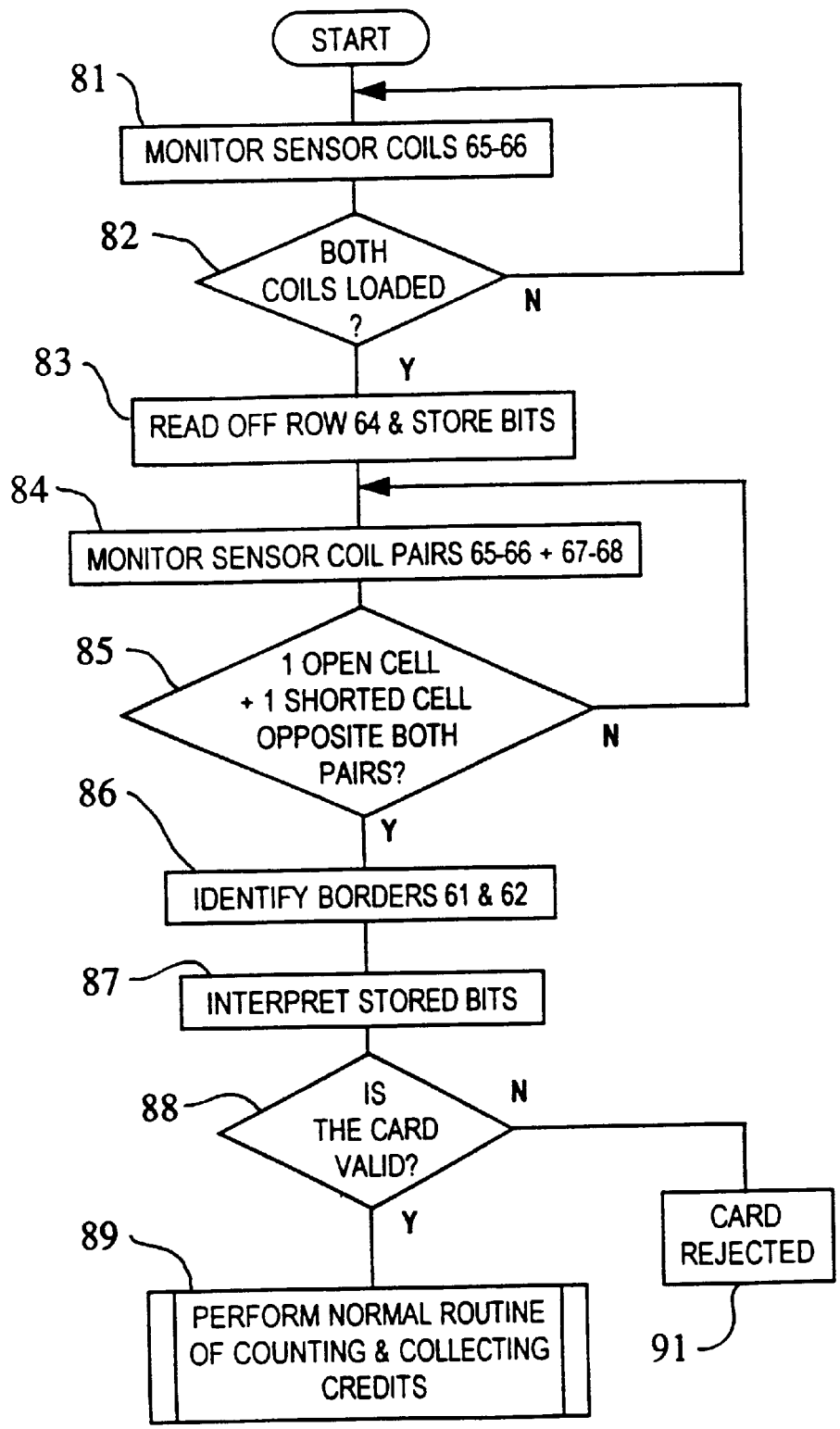
FIG. 5 shows, by means of a flowchart, the steps involved in the reading of supplementary information on a card, according to the principles of the present invention.

FIGS. 4-a–4-c illustrate several positions of the card along its insertion into the reading head, the corresponding reading process sequence being shown in FIG. 5.

Taking as the initial state of a telephone set, the one in which the set is not in use, the circuit keeps monitoring repeatedly sensors 65–66 which have the function of detecting the presence of an inductive debit card. FIG. 4-a shows the condition before the detection, in which card 30 began to be inserted through front slot 69 of the reading head, not having yet reached sensor row 64, the farthest away from the slot. In this figure, the sensors are indicated only by their cylindrical ferrite nuclei; as mentioned, sensor row 64 is responsible for the reading of supplementary data on the card.

FIG. 4-b shows the condition when the front edge 19 of the card has just passed by row 64. In this figure, metalized tracks can be seen under both verifying sensors at positions 65 and 66. On detecting this condition, which is equivalent to "both cells are short-circuited" or "both coils loaded" (steps 82 and 83 of FIG. 5), the reading of all sensors of the row 64 is triggered off, the resulting bits being stored in a temporary register for a later interpretation. Next, the reading process moves to step 84 in FIG. 5, monitoring the two sensor pairs 65–66 and 67–68, i.e., checking the existence of both an open-circuited cell and a short-circuited one in each of the pairs, step 85. This signals that the card has moved to the end of the insertion course within the reading head, as is taught in document BR 9201380-5. At this moment, it is possible to identify the position of the inserted card, that is, the "right-hand" border and the "left-hand" one since, in the case shown, "left-hand" border 61 is adjacent to the open circuited indexing cells 13 and 16 and the "right-hand" border is adjacent to short-circuited cells 14 and 15.

Once this identification is completed, the circuit is able to read, in the correct direction, the bits previously stored, step 87. If this information corresponds to the one considered as valid (relative to the issuing date and issuing country), step 88, the card will be released for use by carrying out the routine already known of counting the available credits and collecting them, according to the number called and the duration of the call, step 89. In the case in which the data resulting from the interpretation of the stored bits is not valid, the card will be rejected, step 91.

Figure 6:
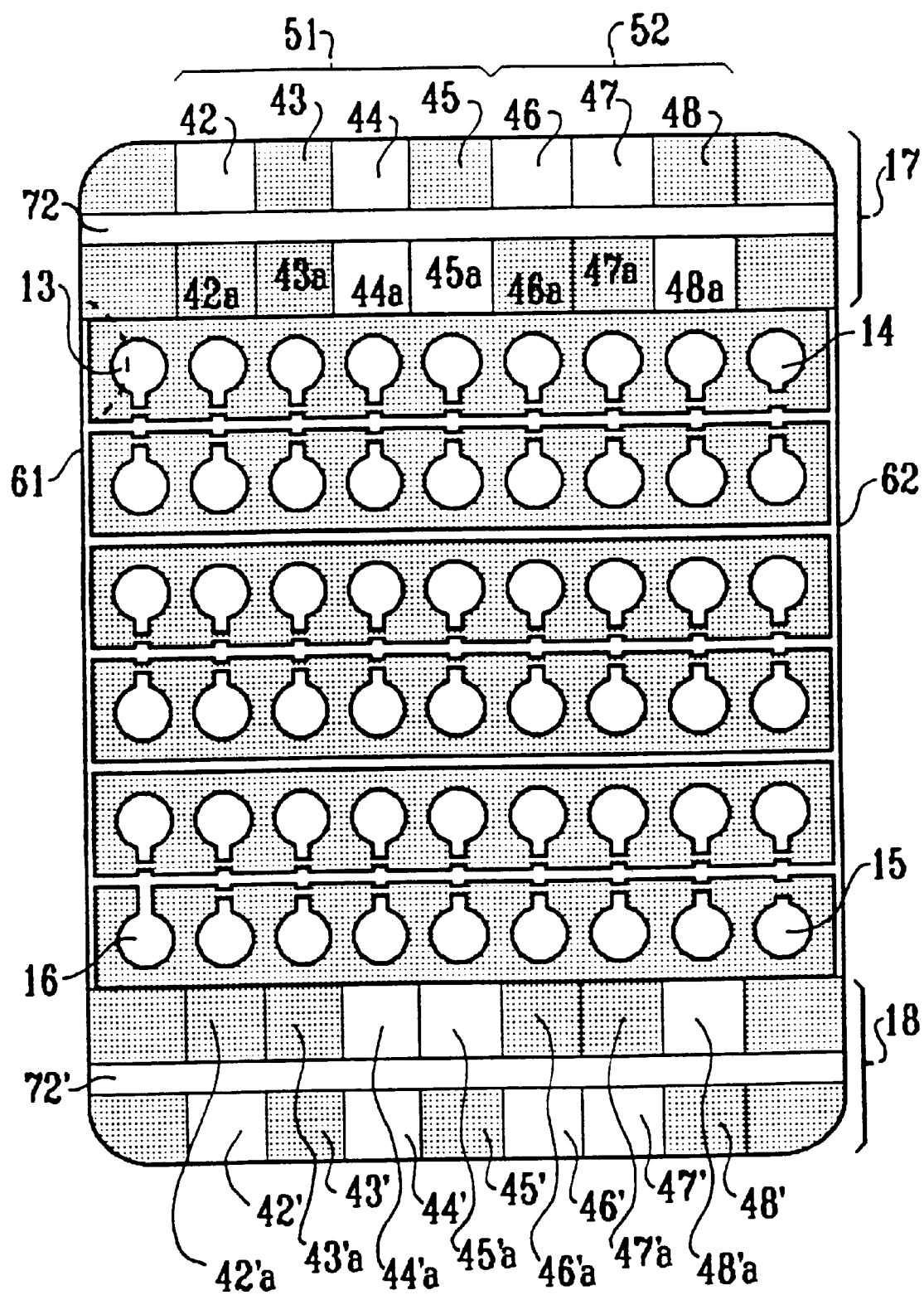
FIG. 6 shows an alternative way of achieving the aims of the present invention with an increase in the number of data items inserted into the handling strips of a card.

FIG. 6 shows a second embodiment of the invention in which each handling area is sub-divided into two strips, allowing the quantity of bits there encoded to be doubled. In this case, on strip 17 there will be a first group of 7 bits, 42, 43 . . . 48, and a second group of 7 bits, 42a, 43a. . . 48a, separated by a non-metalized strip 72, which, when passing by sensors 65–66, signals the exit of the first group from the reading area and the entrance of the second group in the same reading area. Strip 18a is encoded akin to strip 18 so as to allow the reading of supplementary data independently from the position in which the card was inserted into the reading head.

We claim:

1. An inductive debit card comprising:
    a non-porous insulating substrate having a front edge, a back edge, a left edge, and a right edge to define a substantially rectangular shape having four corners;
    a central area on one surface of the substrate having a plurality of credit cells formed of thin conductive metallic film and shaped as closed rings arranged in rows parallel to said front and back edges and in columns parallel to said left and right edges;
    two blank handling strips located along a full width of the card between the central area and the front edge and between the central area and the back edge of the card, respectively, and
    supplementary coding for inclusion of additional information while retaining the arrangement of credit cells in the central area of the card;
    wherein the additional information is coded in the handling strips by the presence or absence of metalized tracks or segments perpendicular to the front and back edges, each of said metalized tracks or segments being aligned with a credit cell column, the presence of a metalized track corresponding to an information bit "1" and the absence of a metalized track corresponding to an information bit "0".

2. The inductive debit card of claim 1, wherein the tracks located on the four corners of the card are metalized.

3. The inductive debit card of claim 2 wherein each handling strip is divided into two parts of substantially equal width, and separated by a blank non-metalized strip parallel to the front edge and the back edge.

4. The inductive debit card of claim 1, wherein the additional information is identical in both handling strips.

5. The inductive debit card of claim 4, wherein each handling strip is divided into two parts of substantially equal width, and separated by a blank non-metalized strip parallel to the front edge and the back edge.

6. The inductive debit card of claim 1, wherein each handling strip is divided into two parts of substantially equal width, and separated by a blank non-metalized strip parallel to the front edge and the back edge.

7. A method for reading supplementary coding on an inductive debit card comprising a flat non-porous insulating substrate having a front edge, a back edge, a left edge, and a right edge to define a substantially rectangular shape having four corners, a central area on one surface of said substrate and having a plurality of credit cells formed of thin conductive metallic film shaped as closed rings, arranged in rows parallel to said front and back edges and in columns parallel to said left and right edges, and two blank handling strips located along the full width of the card between said central area and the front edge and between said central area and the back edge card, respectively, said supplementary coding allowing inclusion of additional information in said handling strips including the presence or absence of metalized tracks or segments perpendicular to said front and back edges, each of said metalized tracks or segments being aligned with a credit cell column, the presence of a metalized track corresponding to information bit "1" and the absence of a metalized track corresponding to information bit "0", said process comprising the steps of:

inserting said card into a reading head having a card insertion slot, through which the card slides into the reading head, and including a plurality of sensors arranged in rows parallel to said card insertion slot and columns perpendicular to said card insertion slot, each sensor position being coincident with a credit cell position when the card is fully inserted into said reading head, the first and last sensors in the rows located farthest and nearest to said insertion slot being card position verifying sensors; and detecting the presence or absence of said metalized tracks by the sensor row located farthest away from said insertion slot prior to full insertion of the card into said reading head.

8. The method of claim 7, wherein the detecting step is triggered by the detection of the presence of metalized tracks by both card verifying sensors in the sensor row located farthest away from the insertion slot when the card is not fully inserted in said reading head.

9. The method of claim 8, further comprising the steps of:

storing information bits "1" corresponding to the presence of metalized tracks and information bits "0" corresponding to the absence of metalized tracks in a temporary register;

detecting completion of card insertion into the reading head by the card position verifying sensors and identifying the left-hand edge and the right-hand edge of the card fully inserted into the reading head;

interpreting said temporarily stored bits; and rejecting or releasing the card for routine and normal credit accounting and collecting.

* * * * *